Figure 1:
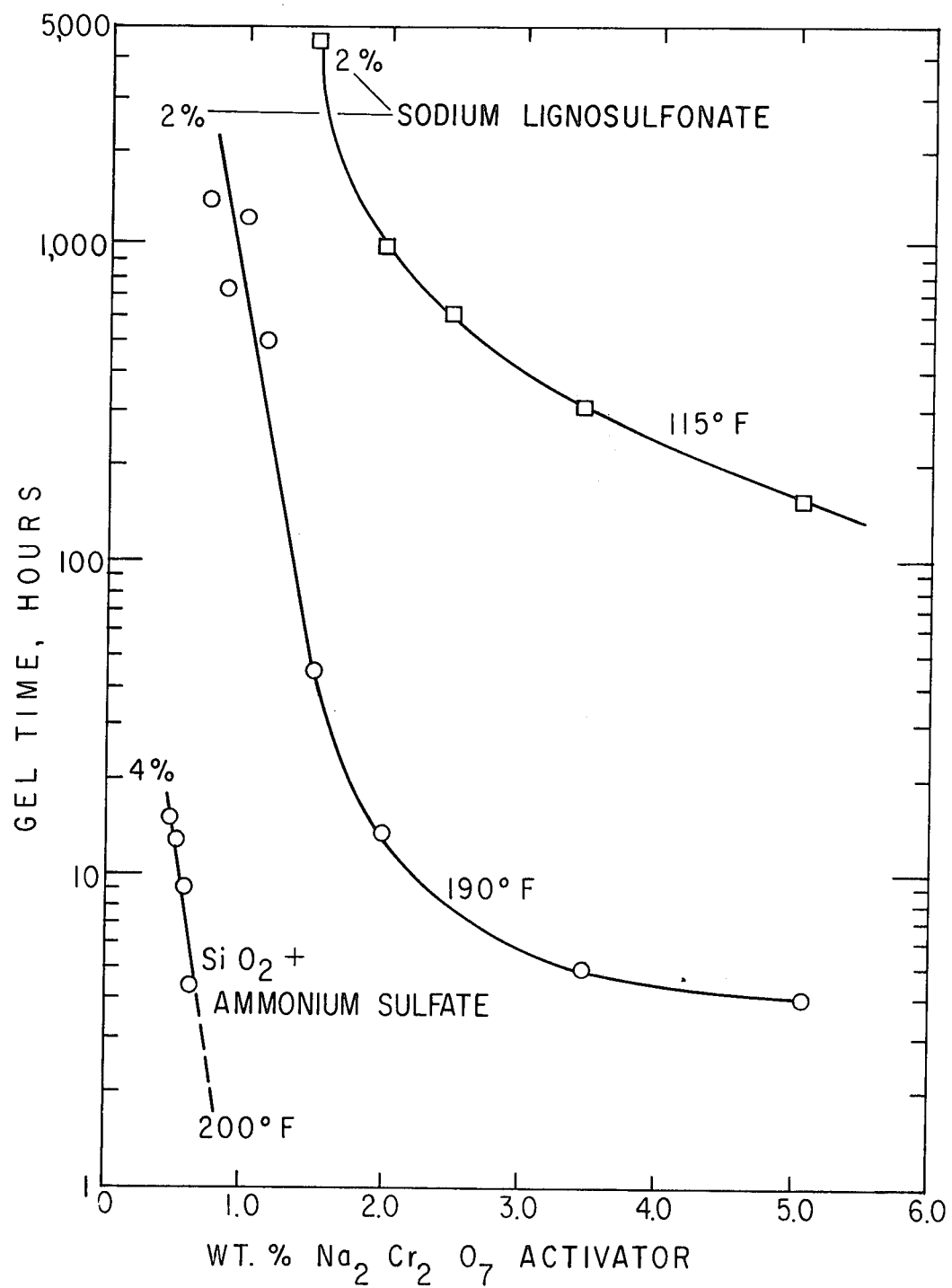

United States Patent [19]
Felber et al.

[11] 3,897,827
[45] Aug. 5, 1975

[54] LIGNOSULFONATE GELS FOR SWEEP IMPROVEMENT IN FLOODING OPERATIONS

[75] Inventors: Betty J. Felber, Tulsa, Okla.; Lowell R. Smith, Houston, Tex.

[73] Assignee: Standard Oil Company, Chicago, Ill.

[22] Filed: July 18, 1974

[21] Appl. No.: 489,657

[52] U.S. Cl.................................. 166/270; 166/274
[51] Int. Cl.² .......................................... E21B 43/22
[58] Field of Search ........... 166/273, 270, 274, 275, 166/305 R, 292; 252/8.55 D

[56] References Cited
UNITED STATES PATENTS

| | | | |
|---|---|---|---|
| 3,180,748 | 4/1965 | Holmgren et al. | 166/292 |
| 3,638,729 | 2/1972 | Parker | 166/273 |

Primary Examiner—Stephen J. Novosad
Assistant Examiner—George Suckfield
Attorney, Agent, or Firm—Arthur McIlroy

[57] ABSTRACT

Improved sweep efficiency in oil-bearing reservoirs having high permeability streaks therein can be effected by first injecting a gel-forming solution consisting essentially of a dichromate activator in a lignosulfonate solution, modified by the presence of an alkali metal halide or an alkaline earth metal halide, such as, for example, sodium chloride or calcium chloride. This system has the advantage of high temperature tolerance and the gel-forming characteristics thereof are not appreciably affected either by formation brine or $CO_2$. Gel-forming solutions can be designed requiring from 10 to 2,000 hours to form a gel.

10 Claims, 5 Drawing Figures ized foot of formation is related to the perme-
ability of the zones.

LIGNOSULFONATE GELS FOR SWEEP IMPROVEMENT IN FLOODING OPERATIONS

The present invention relates to the recovery of oil from underground deposits thereof, in which the permeability is highly nonuniform, resulting in inefficient sweep when such a deposit is subjected to a flooding operation. More particularly, it is concerned with improving the sweep efficiency in a flooding operation by selectively plugging the loose or highly permeable streaks in the matrix with long set-time lignosulfonate gels.

BACKGROUND OF THE INVENTION

Methods for plugging off or reducing the rate of fluid movement in porous media make up a substantial amount of technology, including the in place formation of gels. One current technique involves selective plugging using time-set alkaline gels of sodium silicate. However, the applicable time-set range of these gels limits the treatment volumes. This limitation of silica solutions is particularly severe at temperatures above 170° F because of the pronounced shortening of the gel times. Also, the presence of formation brines or contacts with an acid medium, such as $CO_2$, causes the silicate solution to set prematurely. Moreover, the cost of silicate solutions is such that their use in volumes that would really be effective, e.g., at least 5,000 barrels, is limited.

It is known that gels can be prepared from lignosulfonates activated with a dichromate. Such compositions are used for chemical grouting and other short set-time impregnation of porous media. However, lignosulfonate gels, using only dichromate as the gel accelerator or activator, are much too expensive for large volume oil field treatments.

SUMMARY OF THE INVENTION AND DESCRIPTION OF THE DRAWINGS

Briefly, we have discovered that the addition of a mixed activator, comprising a water-soluble dichromate and an alkali metal or alkaline earth metal salt, to an aqueous lignosulfonate solution, results in a system having a long set-time and produces a low cost, strong gel. A particular advantage of these solutions over other gelforming systems, such as alkaline silica gels, is that the lignosulfonate solutions have long gel times at high temperatures, e.g., 190° F., thus permitting use of large volumes of gel-forming solutions. A further advantage of these systems is the fact that the presence of $CO_2$ or brine does not accelerate the rate of gel formation. Accordingly, our invention contemplates the use of large volumes of long set-time activated lignosulfonate gels to form sweep-improving matrix flow barriers, especially in formations having temperatures above 170° F. Such lignosulfonate formulations include those wherein sodium chloride, magnesium chloride, or calcium chloride, have been added to the dichromate activator, resulting in a significant cost reduction, and imparting added gel strength over the use of dichromate alone. The lignosulfonate gel systems of our invention are particularly useful for selective plugging of highly permeable formations in high-temperature reservoirs. These systems exhibit long gel times at elevated temperatures and are relatively insensitive to pH changes. In contrast, the silica gel plugging agents are deleteriously affected by either of these conditions. Lignosulfonate gels have been prepared at 190° F in accordance with our invention, then elevated to a temperature of 500° F, and maintained at this level for 140 hours. The resulting gels were found to be stronger than those formed at 190° F.

Figure 2:
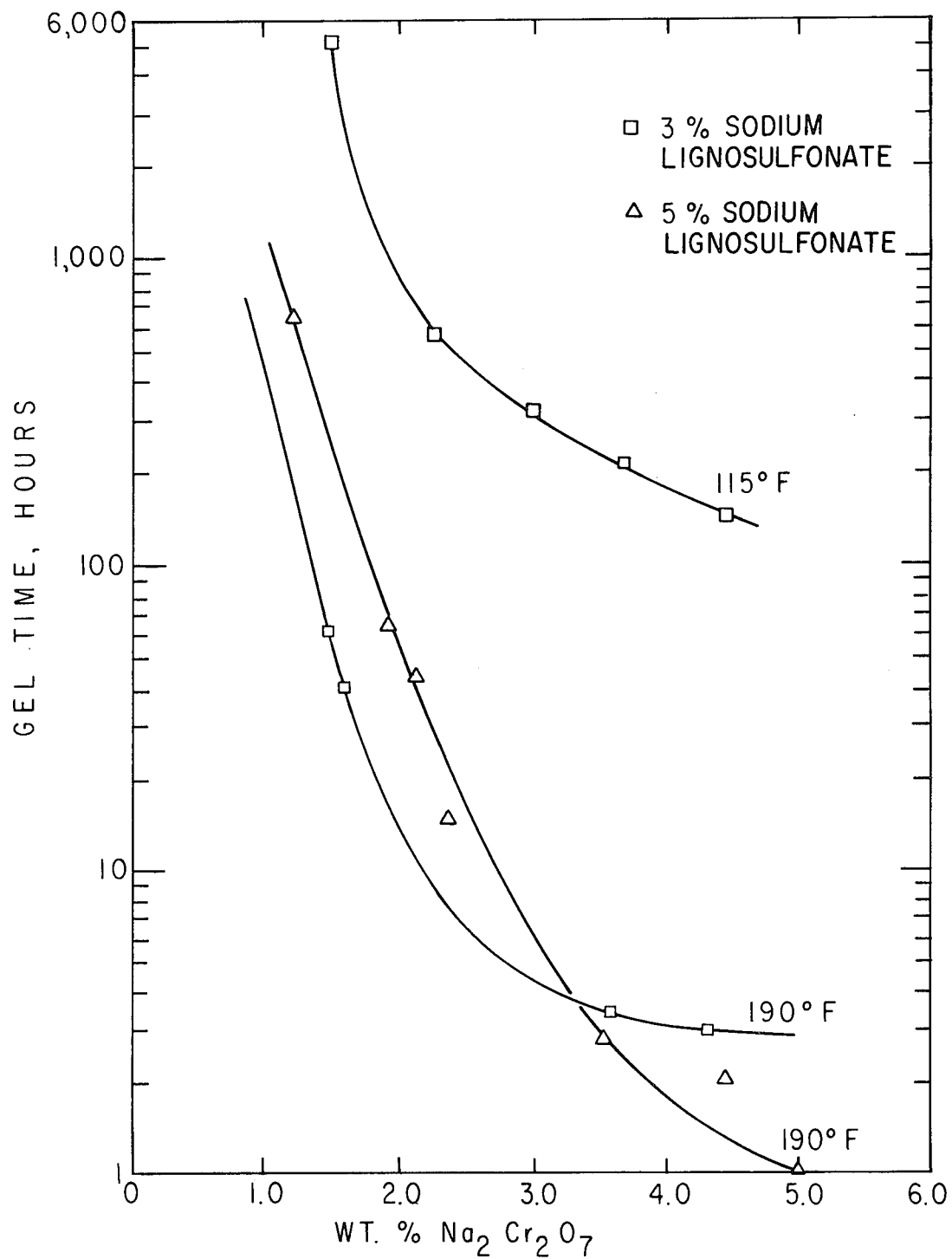
Figure 3:
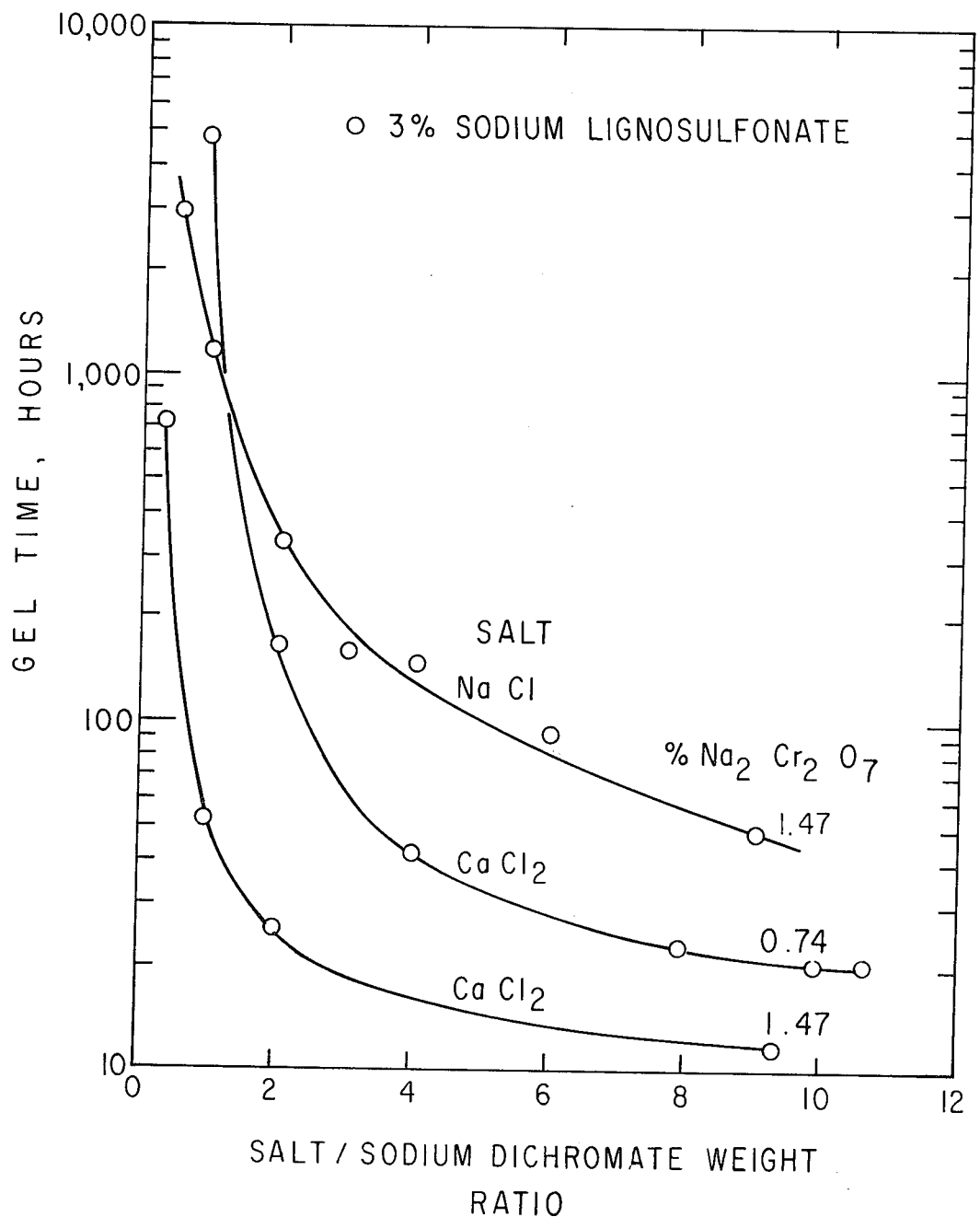
Figure 4:
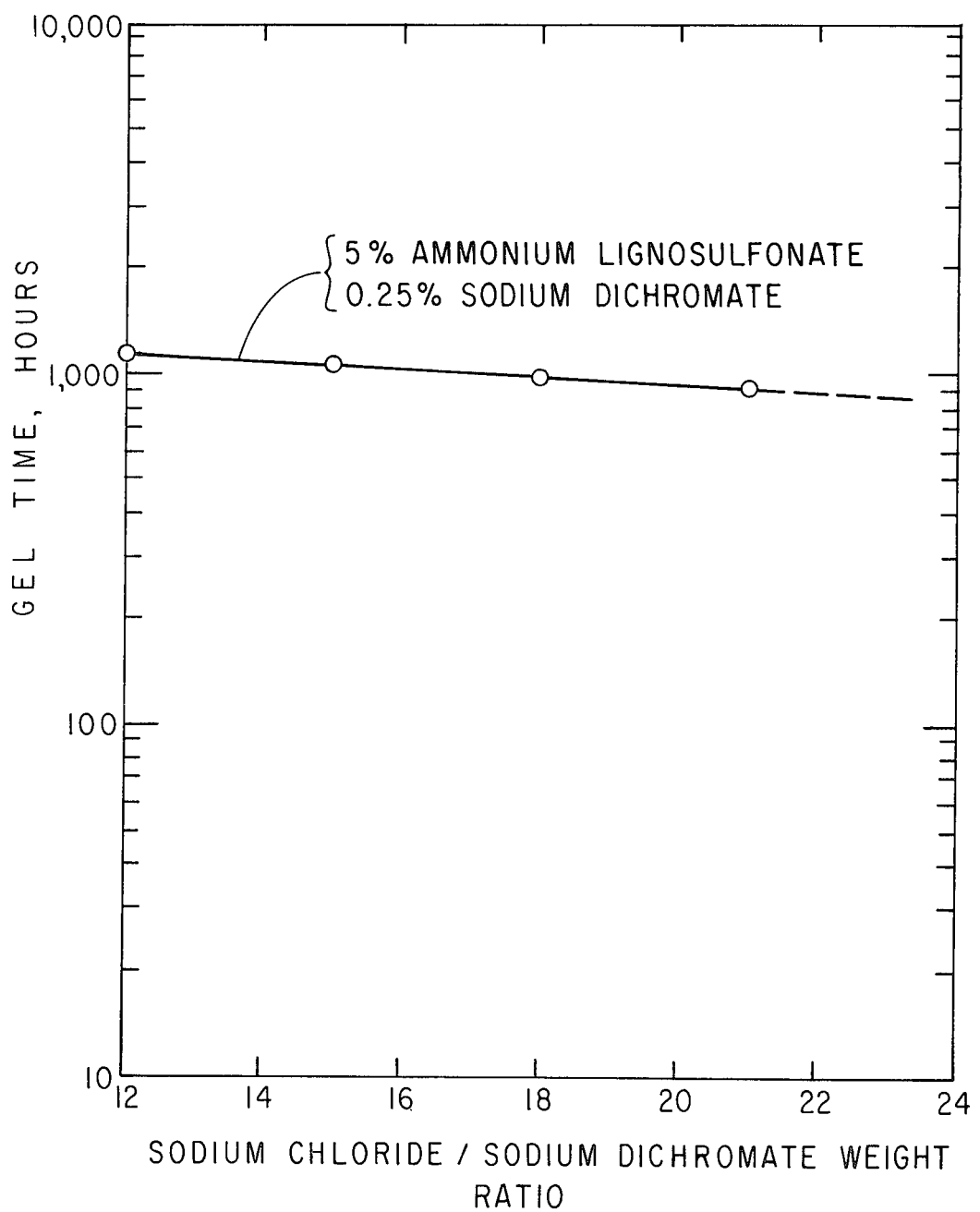
Figure 5:
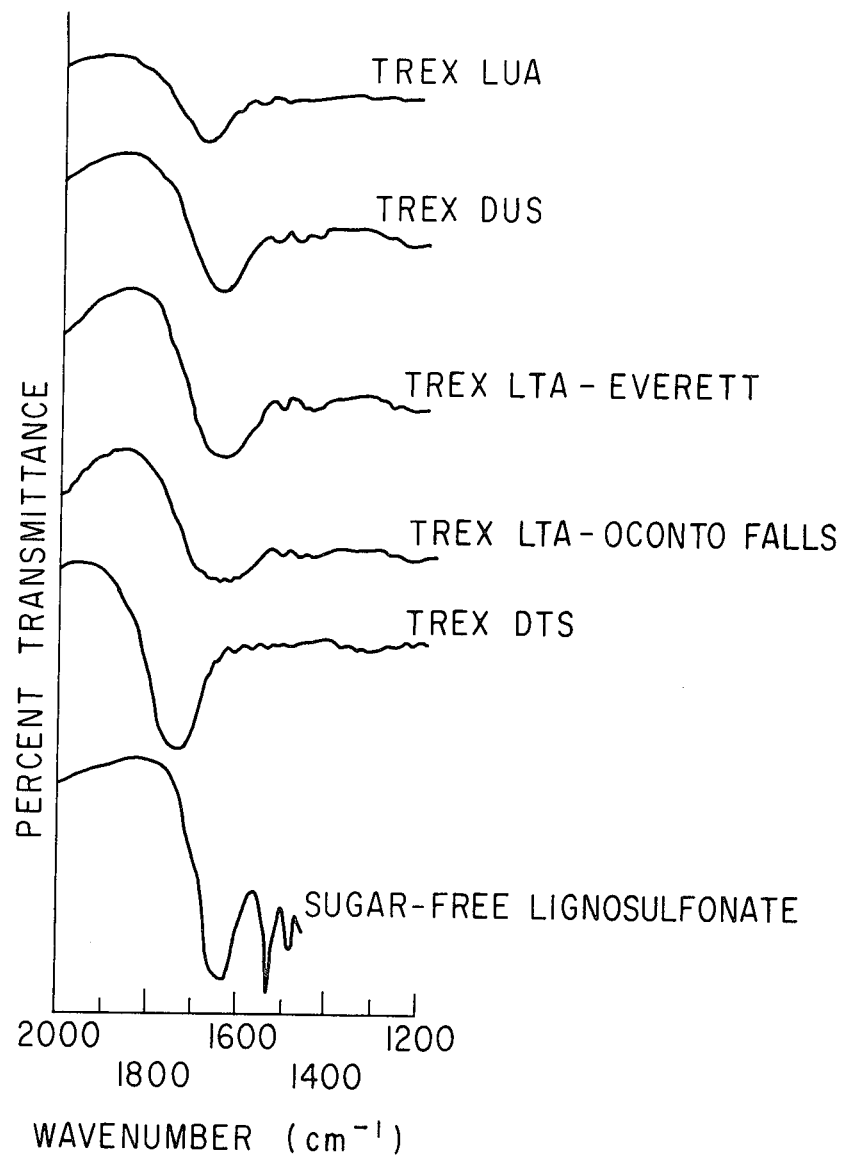

Our invention is illustrated in part by reference to the following drawings, in which FIG. 1 shows the effect of temperature and dichromate activator on the gel time of a 2 percent sodium lignosulfonate solution. Also, for comparison, a 4 percent $SiO_2$ curve is included;

FIG. 2 illustrates the same factors as taken into consideration in FIG. 1, as well as demonstrating that increased lignosulfonate concentration has relatively little effect on gel time;

FIG. 3 demonstrates the effect of salt-dichromate weight ratios on the gel time of a 3 percent sodium lignosulfonate solution, and illustrates also that calcium chloride accelerates the gel time more so than sodium chloride;

FIG. 4 illustrates the effect of different salt-dichromate weight ratios (containing 0.25 weight percent sodium dichromate) on a 5 percent aqueous ammonium lignosulfonate solution at 190° F; and FIG. 5 compares the infrared spectra of a sugar-free lignosulfonate solution with those of sugar-containing lignosulfonate compositions.

In carrying out our invention, we are able to reduce the permeability of a higher temperature oil-bearing formation by injecting into the formation, either through a suitable injection well or producing well, a dilute solution of a sodium or equivalent lignosulfonate containing as a gel activating substance a mixture of a dichromate, such as sodium dichromate, and a halide of an alkali metal or alkaline earth metal. This dilute solution, which may contain the lignosulfonate in concentrations of from about 1 to about 8 weight percent, preferably 2 to 5 weight percent, based on the weight of the final solution, is displaced down the wellbore and into the problem zone, after which it is allowed to set until gel formation occurs. The gel time of the injected solution depends largely upon the type of treatment desired. If the problem zone is at or near the wellbore face, a short-set time, e.g., 10 hours, solution may be used. On the other hand, if it is intended to treat a relatively large inter-well area, the solution should have a gel time of at least about 100 hours, and possibly as much as 1,200 hours or more. Knowing the formation temperature and volume of gel-forming solution to be injected, a solution having the required properties can be prepared by controlling the amount of mixed activator added and the salt-dichromate weight ratio thereof. Owing to the fact that relatively long gel set times, especially at the higher formation temperatures, can be obtained by the use of our invention, it is possible to displace large volumes of gel-forming solutions for much greater distances into the more permeable sections of the formation, resulting in creating a pronounced permeability contrast, which, in turn, favors greater sweep efficiency by forcing the flood medium into what were formerly the tighter oil-bearing zones. In this way, oil displacement efficiency is enhanced by the creation of a more uniform flood advance. The lignosulfonate solution enters the various strata of the formation open to the injection well in proportion to the water permeability of the strata, since the initial flow rate of said solution into the various zones per vertical foot thereof open to the well is highest in the most permeable zones and lowest in the less permeable strata.

Where possible, it is desirable to isolate the offending, high permeability zone by one or more packers or plug-back procedures. The gel-forming solution is then injected into the offending interval while water (or oil if a producing well) is injected into the remaining portion of the formation. This injection procedure insures that the injected gel-forming solution is confined largely to the high permeability zone. Ideally, the relative flow should be balanced so that there is no tendency of the gel-forming solution to flow into the tighter sections. Regulation of flow rates can be achieved by adding a radioactive substance to the gel-forming solution or to the water and locating a gamma ray detecting instrument in the tubing during injection. Balancing flows by this method is known to those skilled in well completion and treatment techniques.

As previously mentioned, dichromate alone has been used in the past in combination with lignosulfonates to produce gels. The use of such compositions for our purposes, however, is objectionable for at least two reasons. First, because of the relatively high dichromate concentration, i.e., 4.5 weight percent and above, they are too costly to be employed in the volumes contemplated herein, and, secondly, they gel too fast to be of any practical value. In cases where it is desired to plug portions of the formation in the vicinity of the well bore, gel times of from 10 to 20 hours are preferable, whereas, injection times of 1 to 5 weeks, or more, are necessary in order to introduce the required volume of gel-forming solution for extensive plugging of the more permeable zones in the inter-well area. This, in turn, means that the gel time of such solutions should be at least as long as the injection period. Because of these and other considerations, the concentration of dichromate employed should not be in excess of about 2.5 weight percent, based on the weight of the final solution, and may range down to concentrations of 0.5 or 0.25 weight percent. The concentration of salt needed to produce systems having gel times within the range required varies inversely with the dichromate concentration. Also, it should be pointed out that calcium chloride acts faster in combination with the dichromate as a gel accelerator than a mixed activator comprising sodium chloride and a water-soluble dichromate. With dichromate concentrations of 2.5 weight percent in the lignosulfonate solutions, a sodium chloridedichromate weight ratio of 1:1 results in a system having a gel time in excess of about 250 hours at a temperature of 115° F. With systems having a dichromate concentration of the order of 0.15 to 0.25 weight percent the salt-dichromate weight ratio should be in the neighborhood of 50:1 to 55:1 to achieve a gel time in excess of 1000 hours at 115° F. Within the above dichromate concentration range and the range of weight ratio specified, the resulting systems were relatively insensitive to the salt in the mixed activator.

The time required to form a gel depends to a great extent upon the temperature of the reservoir to be treated. Thus, for example, with a lignosulfonate solution containing 2.5 weight percent dichromate and having a sodium chloride-dichromate weight ratio of 1:1, a gel can be formed in a period of about 250 hours at 115° F, whereas at temperatures of 75° F, the time required for gel formation would be about 350 hours. When calcium chloride is substituted for sodium chloride, the gel time would be shorter.

Accordingly, it is seen that gel formation time in the case of the systems contemplated herein is dependent primarily upon (1) the amount of dichromate present; (2) the amount of salt present, and (3) the temperature to which the solutions are subjected.

As examples of the halide suitable for use in preparing the mixed activators taught herein, there may be mentioned potassium chloride, lithium chloride, sodium chloride, sodium bromide, calcium iodide, calcium chloride, magnesium bromide, magnesium iodide, magnesium chloride, barium chloride, and the like. The use of the above-named halides in accordance with our invention makes possible systems having extended set times with reduced concentrations of dichromate. As a practical matter, the cost of materials other than sodium chloride, calcium chloride and magnesium chloride, generally rules out other salts for the preparation of large volumes of gel-forming solutions.

The lignosulfonates used in preparing the gel-forming solutions of our invention are a byproduct of the wood pulp industry and are generally supplied in the form of a concentrated (50 percent to 60 percent) aqueous solution, or as a powder. The latter, however, shows considerable filterable solids after it is put in the solution, and therefore should be filtered before use to avoid face plugging of the injection well. The sulfonate supplied in liquid form generally is found to be free of objectionable amounts of filterable solids. Ammonium lignosulfonate is considered to be the most desirable as a gelling agent because of the low cost and relatively uniform properties. An example of such a product is a TREX LTA, an ammonium lignosulfonate sold by Scott Paper Company. Other forms of lignosulfonate are also suitable, e.g., sodium, calcium, magnesium lignosulfonate, etc. TREX DTS, a sodium lignosulfonate also sold by Scott Paper Company, is another example of a suitable product. Ammonium lignosulfonates are formed by cooking wood pulp in a digester under controlled conditions of temperature (140°–150° F) and pressure with ammonium bisulfite and sulfur dioxide. The ammonium bisulfite and sulfur dioxide react with the lignin contained in wood to form water-soluble lignosulfonates. The resulting product is a complex mixture of ammonium lignin sulfonates, wood sugars, and other carbohydrates. Simple filtration removes the lignosulfonate (10 percent solids) from the wood pulp.

In preparing these gel-forming solutions in the field for use, weighed amounts of dichromate and of the alkaline earth or alkali metal salt are added to water and thoroughly dissolved in a suitable circulating or mixing tank. To the resulting solution, a 50 to 60 weight percent aqueous lignosulfonate solution is then pumped in while agitating to give a gel-forming solution of the desired lignosulfonate content. The amount of lignosulfonate present may vary, but generally should not exceed about 8 weight percent.

The quantity of lignosulfonate solution modified with the dichromate-salt mixed activator employed may vary widely from well to well, depending on the distance out into the formation it is desired to form the gel. In some cases, it may be necessary to extend the gelforming solution as much as 1,500 to 2,000 feet out from the well, in which case, volumes of the order of 100,000 to 225,000 barrels may be required. Thief zones or heterogeneities at or near the well bore generally may need not more than from about 5 to about 25 barrels of gel-forming solution per vertical foot of formation. In these volumes and in the absence of thief zones, the gel-forming solution can be displaced out into high permeability streaks from 15 to 75 feet. Generally speaking, however, the volume of solution used depends upon the gel time of the solution, the nature of the problem and the characteristics of the formation. For a given situation, the volume of solution required to penetrate a given distance from the wellbore may be computed by knowledge of the thickness and porosity of the problem zone.

PREFERRED EMBODIMENTS OF THE INVENTION

Our invention is further illustrated by reference to the accompanying drawings wherein FIG. 1 shows two gel time curves of a 2 percent aqueous sodium lignosulfonate solution activated only with sodium dichromate. Separate tests were conducted at 115°F and at 190°F with the weight percent of sodium dichromate activator plotted against gel time in hours. The effect of the higher temmperature on gel time for systems of this kind is rather dramatically demonstrated, as is the gel time of a 4 percent silicate solution with an ammonium sulfate activator at 200°F. The short gel time and steep slope demonstrate the limitations of silica gel at high temperatures. Small errors in activator content can produce large discrepancies in anticipated gel times.

FIG. 2 demonstrates that for a given amount of activator temperature is an important factor in determining gel time of lignosulfonate solutions, and that the amount of lignosulfonate is much less important in influencing gel formation; increasing the concentration of activator at a given temperature decreases the gel time for a given system. Long gel times are obtained at the steep portion of the curves. Small changes in the dichromate content can cause unexpectedly short or long gel times. Lignosulfonates at 115°F, however, when activated only by dichromate, do not gel in practical time limits at concentrations below 1 weight percent.

The effect of the mixed activators of our invention at 115°F is illustrated in FIG. 3, in which a 3 percent aqueous sodium lignosulfonate solution containing varying amounts of sodium dichromate was used. It will be seen that for a given dichromate concentration the gel time curve tends to flatten out as the weight ratio of added salt to dichromate is increased. This desensitization effect is a major advantage of the lignosulfonate gel system over silica gel systems, whose reactions are uncontrollably accelerated when they come in contact with brine or $CO_2$. Increased gel times are achieved as the dichromate content is reduced from 1.47 to 0.74 percent for a mixed activator containing calcium chloride. Gel times can be increased to several thousand hours by further reducing the dichromate. Considerable economic benefit is derived by reducing the dichromate content to the lowest possible level as it is the most expensive component of the gel-forming mixture. This further shows that longer gel times can also be achieved by using sodium chloride, rather than calcium chloride, as a component in the mixed activator.

The curve in FIG. 4 shows the effect of different salt-dichromate weight ratios (containing 0.25 weight percent sodium dichromate) on a 2 weight percent aqueous lignosulfonate solution at 190°F. Specifically, it is seen that long gel times can be obtained with lignosulfonate gel systems having mixed activators using very low dichromate concentrations at high temperatures. It can also be seen that the gel time is relatively insensitive to variation with increasing salt-dichromate weight ratios.

FIG. 5 shows a series of infrared spectra obtained with lignosulfonate solutions of different compositions. With the exception of the bottom curve, such solutions are within the scope of our invention. The first five solutions contained reducing sugars in amounts ranging from 2.3 percent to 19.9 percent, while the bottom curve was essentially pure lignosulfonate and was free of reducing sugars. This composition exhibited strong peaks between 1,600 $cm^{-1}$ and 1,430 $cm^{-1}$, indicating the presence of aromatic components and that it is pure. In contrast, the other compositions do not display strong bands in this region, even though they are all aromatic, because of overlapping of the stretching and bending modes of each of the compounds, e.g., reducing sugars, lignosulfonates of varying molecular weights and other carbohydrates present. The gel times of lignosulfonates identical in composition to those referred to in this set of curves are shown in the Table below.

In our investigation, we have discovered that the lignosulfonates containing little, i.e., less than 2 weight percent, or no sugars are unsatisfactory for preparing gel-forming solutions having gel set times that approach practical limits. Generally speaking, the commercially available compositions contain from 50 to 80 percent lignosulfonates with the balance consisting of sulfur, reducing sugars, ash and nitrogen. The reducing sugar content of these compositions generally ranges from about 2 to about 20 percent.

The influence of the presence or absence of sugars and the source of the lignosulfonate on gel time is demonstrated below. In this work, the particular gel-forming solution was prepared by dissolving 8.9 grams of sodium chloride and 8.1 grams of sodium dichromate in 150 ml of water. To this solution, was then added with agitation 12.1 grams (dry basis) of a given lignosulfonate. Solutions prepared in the above manner and each containing a different lignosulfonate were then allowed to stand at specified temperatures and their gel times observed.

TABLE I

| | TEMPERATURE, °F GEL TIME, HRS. | | | |
|---|---|---|---|---|
| LIGNOSULFONATE | 75° | 115° | 160° | 190° |
| Sugar-free Lignosulfonate[1] | 2.0 | — | — | — |
| LUA[2]* | 6.7 | 2.0 | 1.0 | 0.5 |
| DUS[3]** | 7.7 | 2.7 | 1.5 | 0.6 |
| LTA[4]* | 8.5 | 2.75 | 1.5 | 0.7 |
| LTA[5]** | 30.3 | 6.0 | 2.75 | 0.8 |
| DTS[6]** | 71.0 | 11.7 | 4.0 | 1.2 |

[1]Purified dry sodium lignosulfonate.
[2]Liquid ammonium lignosulfonate fractionated from crude ammonium salt derived from 100% soft wood - approximately 80% lignosulfonates.
[3]Dry sodium lignosulfonate fractionated from crude sodium salt derived from soft wood (66%) and hard wood (34%) - approximately 80% lignosulfonate.
[4]Liquid ammonium lignosulfonate concentrated crude material, 50 to 60% sulfonates from 100% soft wood.
[5]Liquid ammonium lignosulfonate concentrated crude material, 50 to 60% sulfonates from 66% soft wood and 34% hard wood.
[6]Dry sodium lignosulfonate from ammonium salt obtained from 66% soft wood and 34% hard wood.
*Produced by Scott Paper Company plant at Everett, Washington.
**Produced by Scott Paper Company plant at Oconto Falls, Wisconsin.

Since from our work we know that the gel time for a given system decreases with increasing temperature, it was considered unnecessary to test the sugar-free lignosulfonate at temperatures other than 75° F because it was apparent this material lacked the basic properties required for a long gel time system. The relatively high dichromate and sodium chloride concentration in the solutions tested also appreciably affected the gel times of the sugar-containing systems, yet it will be seen that in all cases the required period for gel formation was at least three times longer than was the case with the sugar-free system.

The ability of the mixed activator lignosulfonate gel system to flow through a porous medium and plug it on gelation was tested in a sand pack 10 inches long and 0.75 inch in diameter. Distilled water was initially injected, and the permeability was determined to be 2,900 millidarcies. At 115° F, a 3 percent TREX DTS lignosulfonate, with a mixed activator of 0.74 percent dichromate and 1.3 percent calcium chloride, was then injected and allowed to gel. The solution gelled after about 350 hours, as indicated by an identical sample placed in a glass container. Water was subsequently injected into the sand pack. The permeability was reduced to 0.78 millidarcies, a 3,700-fold permeability decrease.

While the foregoing description is illustrative of various embodiments of our invention, it is not to be construed as limiting the scope thereof. For example, other volumes of gel-forming solutions outside the ranges mentioned may be used to advantage and other dichromates, such as ammonium dichromate may be used in place of sodium dichromate. In summary, it may be said that our invention contemplates the use of lignosulfonate compositions containing mixed activators of the type taught herein as a plugging agent in high permeability zones to render oil-bearing strata more uniform in permeability so that in subsequent flooding operations greater sweep efficiency can be realized. It should also be mentioned that in the field, instead of adding salt to the system in preparing the mixed activator, oil field brines may be used since they contain sufficient salts of the type required by our invention to supply the salt component of the mixed activator. Typical of the salts contained in such brines are the alkali metal and alkaline earth metal halides, nitrates, sufates and carbonates. In instances where brines of this kind are available in the field, we generally would prefer to use them.

We claim:

1. In a method for the recovery of oil from an underground deposit thereof, said deposit being penetrated by an injection well and by a producing well, in which method a flooding medium in injected into said deposit through said injection well to displace oil toward said producing well, and wherein said flooding medium tends to channel through relatively high permeability strata in said deposit, resulting in a non-uniform flood front, the improvement which comprises introducing into said deposit an aqueous gel-forming solution of a water-soluble lignosulfonate containing from about 2 to about 20 weight percent reducing sugars, and having dissolved in said solution a mixed activator of a water-soluble dichromate and a water-soluble salt selected from the group consisting of alkali metal and alkaline earth metal halides, sulfates, nitrates and carbonates, said dichromate being present in an amount from about 0.15 to about 2.5 weight percent and the salt-dichromate weight ratio ranging from about 1:1 to about 55:1, said ratio varying inversely with the concentration of the dichromate, said solution being in an amount sufficient to flow into said high permeability strata, allowing said solution to set in said high permeability strata to form a gel therein, thereafter introducing said flooding medium into said deposit through said injection well, and recovering oil from said producing well.

2. The process of claim 1 in which said gel-forming solution is introduced into said deposit via said injection well.

3. The method of claim 2 wherein the weight ratio of said water-soluble salt to dichromate ranges from about 1:1 to about 25:1.

4. The process of claim 1 in which said gel-forming solution is introduced into said deposit via said producing well.

5. The method of claim 4 wherein the weight ratio of said water-soluble salt to dichromate ranges from about 1:1 to about 25:1.

6. The method of claim 1, wherein the weight ratio of said water-soluble salt to dichromate ranges from about 1:1 to about 25:1.

7. The method of claim 1, wherein said mixed activator consists essentially of a water-soluble dichromate and sodium chloride.

8. The method of claim 1, wherein said mixed activator consists essentially of a water-soluble dichromate and calcium chloride.

9. The method of claim 1, wherein the amount of said solution employed ranges from about 5 to about 25 barrels per vertical foot of formation.

10. The method of claim 1, wherein the amount of lignosulfonnate employed in said solution ranges from about 1 to about 8 weight percent.

* * * * *